US012172107B2

(12) United States Patent
Fuller-Ng et al.

(10) Patent No.: US 12,172,107 B2
(45) Date of Patent: Dec. 24, 2024

(54) AIR-DIRT SEPARATOR WITH DEGASSER UNIT

(71) Applicant: Wessels Company, Greenwood, IN (US)

(72) Inventors: James Fuller-Ng, Beech Grove, IN (US); Samuel Fuller, Westfield, IN (US); James Fuller, Zionsville, IN (US)

(73) Assignee: Wessels Company, Greenwood, IN (US)

( * ) Notice: Subject to any disclaimer, the term of this patent is extended or adjusted under 35 U.S.C. 154(b) by 0 days.

(21) Appl. No.: 17/715,910

(22) Filed: Apr. 7, 2022

(65) Prior Publication Data

US 2022/0323884 A1 Oct. 13, 2022

Related U.S. Application Data

(60) Provisional application No. 63/171,852, filed on Apr. 7, 2021.

(51) Int. Cl.
*B01D 19/00* (2006.01)

(52) U.S. Cl.
CPC ..... *B01D 19/0042* (2013.01); *B01D 19/0031* (2013.01)

(58) Field of Classification Search
CPC ............... B01D 19/0042; B01D 19/0031
USPC ................ 96/155–220; 95/241–266
See application file for complete search history.

(56) References Cited

U.S. PATENT DOCUMENTS

| 5,104,525 A * | 4/1992 | Roderick | B01D 19/0005 210/241 |
| 6,214,096 B1 * | 4/2001 | Kwak | B01D 19/0042 96/206 |
| 6,752,860 B1 * | 6/2004 | Hoydal | E21B 43/36 96/216 |
| 2016/0332172 A1 * | 11/2016 | Millard | B01D 21/2494 |
| 2018/0169544 A1 * | 6/2018 | Roddy | H04N 5/77 |

* cited by examiner

*Primary Examiner* — T. Bennett McKenzie
(74) *Attorney, Agent, or Firm* — Barnes & Thornburg LLP

(57) ABSTRACT

An air-dirt separator adapted to reduce entrained and dissolved air and separate debris from fluid moving through the air-dirt separator is described in the present disclosure. The air-dirt separator includes a degasser unit adapted to reduce pressure in a cavity within the air-dirt separator to enable improved dissolved air reduction.

8 Claims, 4 Drawing Sheets

AIR-DIRT SEPARATOR WITH DEGASSER UNIT

CROSS REFERENCE TO RELATED APPLICATIONS

This application claims priority to and the benefit of U.S. Provisional Patent Application No. 63/171,852, filed 7 Apr. 2021, the disclosure of which is now expressly incorporated herein by reference.

BACKGROUND

Air-dirt separators are designed to reduce entrained air and separate debris from fluid moving through the air-dirt separator. In many air-dirt separators, an internal coalescing device facilitates the separation of air and dirt from the flow of a fluid.

SUMMARY

The present disclosure may comprise one or more of the following features and combinations thereof.

An air-dirt separator adapted for use in a hydronic system is disclosed in this paper. The air-dirt separator may include a housing and a plurality of coalescing baffles, sometimes called a coalescing media. The housing may have an inlet and an outlet each adapted to be fluidly coupled to a line. The housing may be shaped to define a primary cavity arranged between the inlet and the outlet. The plurality of coalescing baffles may be configured to encourage the separation of air and dirt from fluid flow moving through the air-dirt separator.

In illustrative embodiments, the housing further defines a secondary cavity adjacent to the primary cavity. A degasser unit is optionally installed to reduce pressure of the fluid flow in the secondary cavity. At lower pressures, air in the fluid flow is removed from solution and may be removed from the fluid flow and vented out of the housing.

In illustrative embodiments, the degasser unit includes a pump configured to draw on the secondary cavity within the housing to lower pressure in the secondary cavity. The pump may discharge fluid flow from the secondary cavity at the outlet of the housing to mix with fluid exiting the housing thereby mixing the air-depleted fluid back into the system and thereby reducing the overall air dissolved in fluid exiting the air-dirt separator.

In illustrative embodiments, the degasser unit includes a pump-control valve arranged between the pump and the outlet of the housing to modulate the flow of fluid discharged from the pump. Adjustment of the pump-control valve can control the reduction of pressure in the secondary cavity so that they air-dirt separator is operable with different pumps. In some embodiments, the pump-control valve may be an electronically-controlled valve. In such embodiments, modulation of the flow of fluid discharged from the pump can be adjusted based on sensor input (such as secondary cavity pressure) or other parameters.

In illustrative embodiments, the air-dirt separator may include pressure-relief means for raising the pressure within the secondary cavity in response to pressure in the secondary cavity moving below a threshold. The pressure-relief means may be provided by a sensor that detects pressure in the secondary cavity and a controller. The controller may be configured to change operation of the pump and/or modulation of the pump-control valve to raise pressure in the secondary cavity. The pressure-relief means may also be provided by a pressure-activated valve that opens upon pressure in the secondary cavity moving below the threshold to allow more fluid to flow from the primary cavity to the secondary cavity.

In illustrative embodiments, the housing includes partition arranged between the primary cavity and the secondary cavity. The partition includes a diaphragm, a metered flow hole, and an air-flow valve. The diaphragm has a dome-shape extending upwardly toward the secondary cavity and separates the primary cavity from the secondary cavity. The metered flow hole allows fluid to pass from the primary cavity to the secondary cavity at a controlled rate while allowing the pressure in the secondary cavity to fall below that of the primary cavity. The air-flow valve is provided by an aperture formed in the top of the diaphragm that is selectively closed by a float when fluid fills the primary cavity. The float is supported in the primary cavity by a cage coupled to the diaphragm that is fluidly open to the primary cavity.

These and other features of the present disclosure will become more apparent from the following description of the illustrative embodiments.

DETAILED DESCRIPTION

Figure 1:
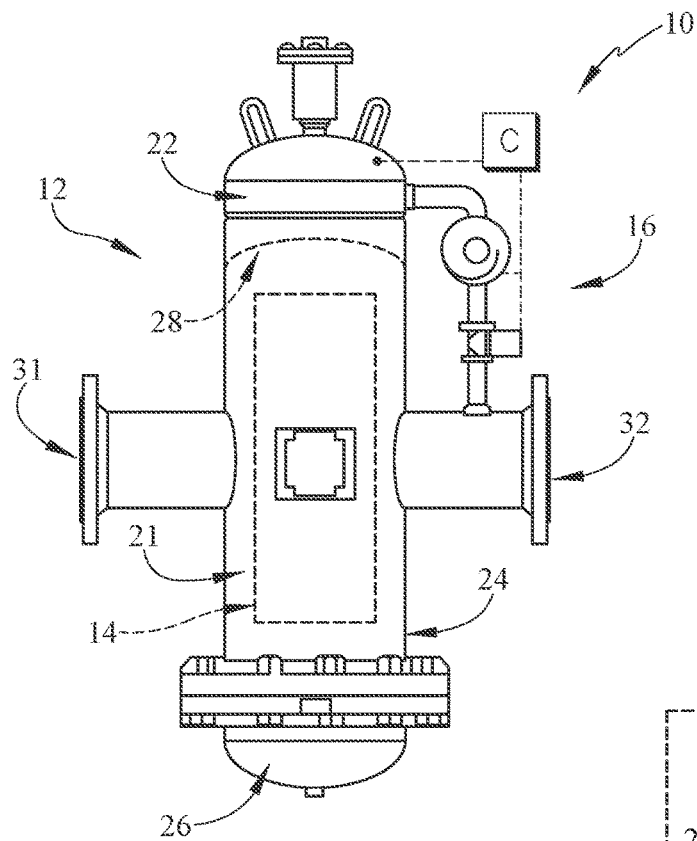
FIG. 1 is a front elevation view of an illustrative air-dirt separator according to the present disclosure that includes a housing that supports coalescing baffles in a fluid flow path and including a degasser unit configured to reduce pressure within a portion of the housing so that air in fluid flowing through the housing will come out of solution for venting.
Figure 2:
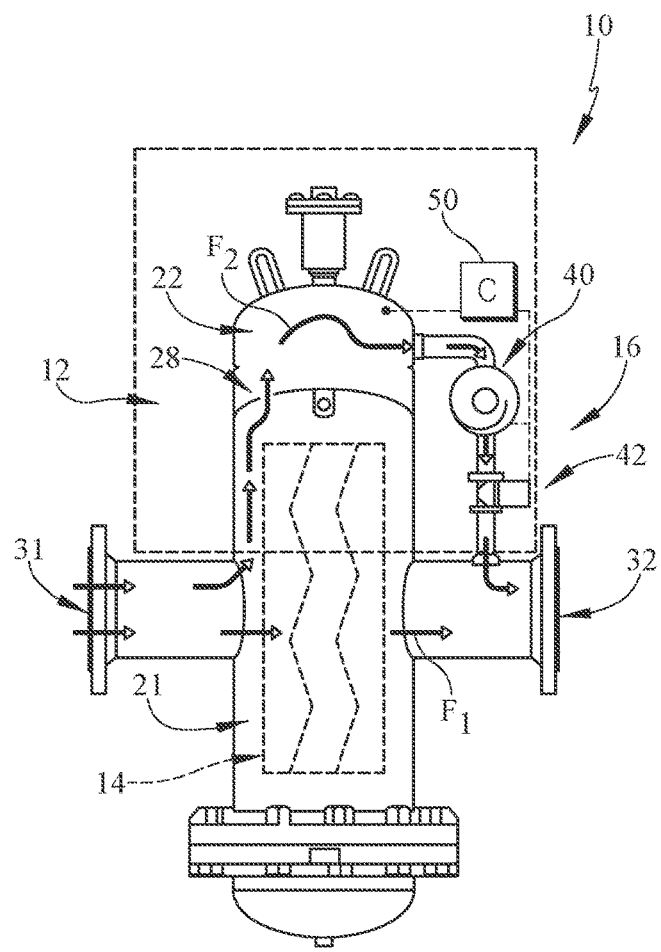
FIG. 2 is a front elevation view of the air-dirt separator of FIG. 1 with a portion of the housing broken away to show that the housing defines a primary cavity housing the coalescing baffles and a secondary cavity in which the degasser unit generates a low-pressure zone so as to bring air out of solution in fluid for venting.

For the purposes of promoting an understanding of the principles of the disclosure, reference will now be made to a number of illustrative embodiments illustrated in the drawings and specific language will be used to describe the same.

An illustrative air-dirt separator 10 shown in FIG. 1 is adapted to reduce entrained and dissolved air and separate debris from fluid moving through the air-dirt separator 10. The air-dirt separator 10 includes a housing 12, coalescing baffles 14, and a degasser unit 16. The housing 12 defines a primary cavity 21 that houses the coalescing baffles 14 and a secondary cavity 22 coupled to the degasser unit 16. The coalescing baffles 14 provide a coalescing media configured to interact with a primary fluid flow F1 to cause air to agglomerate for venting and dirt to separate and fall to the bottom of the housing 12. The degasser unit 16 lowers pressure in the secondary cavity 22 so that dissolved air in a secondary flow F2 comes out of solution for venting.

The housing 12 illustratively includes a main body 24, a floor cap 26, and a partition 28. The main body 24 has an inlet 31 and an outlet 32 with the primary cavity 21 arranged therebetween. The main body 24 also defines the secondary cavity 22 above the primary cavity 21. The floor cap 26 is removable to allow for removal of dirt and debris that has fallen after interaction of the primary flow F1 with the coalescing baffles 14. The partition 28 separates the primary cavity 21 from the secondary cavity 22 while allowing flow from the primary cavity 21 to the secondary cavity 22 in such a way that the pressure in the secondary cavity 22 may be drawn down below that of the pressure in the primary cavity 21.

Figure 3:
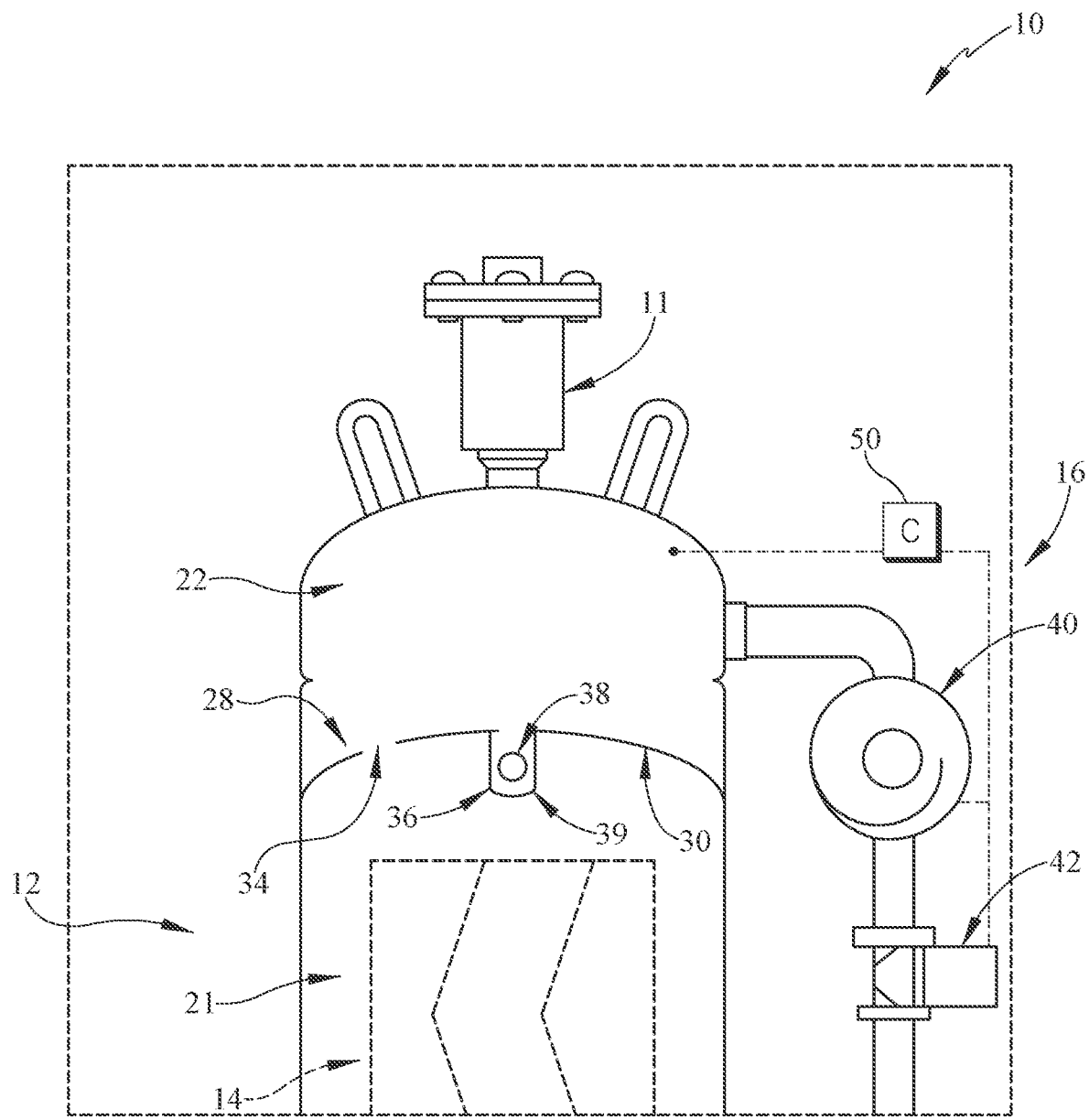
FIG. 3 is a detail view of a portion of FIG. 2 showing that the housing includes partition between the primary cavity and the secondary cavity having a diaphragm, a metered flow hole, and an air-flow valve (float valve), and further showing that the degasser unit includes a pump, an optional pump-control valve (illustratively electronically-controlled via solenoid), and a optional pressure-relief means provided by a pressure sensor in the secondary cavity and a controller configured to direct the pump and/or the pump-control valve based on pressure in the secondary cavity moving below a threshold.

The partition 28 includes a diaphragm 30, a metered flow hole 34, and an air-flow valve 36 as shown in FIG. 3. The diaphragm 30 has a dome-shape extending upwardly toward the secondary cavity 22. The metered flow hole 34 is sized to allow fluid to pass from the primary cavity 21 to the secondary cavity 22 at a controlled rate while allowing the pressure in the secondary cavity 22 to fall below that of the primary cavity 21. The air-flow valve 36 is provided by an aperture formed in the top of the diaphragm 30 that is selectively closed by a float 38 when fluid fills the primary cavity 21. The float 38 is supported in the primary cavity 21 by a cage 39 coupled to the diaphragm 30 that is fluidly open to the primary cavity 21.

The coalescing baffles 14 are illustratively perforated plates as described in U.S. Pat. No. 10,708,538 to Fuller et al., which is hereby incorporated by reference in its entirety. It is noted that other suitable coalescing media may also be used such as perforated tubes, screens, tabs, or the like as is known in the art.

The degasser unit 16 provides means for generating a low-pressure zone in the secondary cavity 22 so that air dissolved in a secondary fluid flow moving through the secondary cavity comes out of solution for venting. The degasser unit 16 further provides means for joining the secondary fluid flow F2 after air from the secondary fluid flow F2 is vented with the primary fluid flow F1 so as to allow the secondary fluid flow F2 to absorb air in the primary fluid flow F1 resulting in lower overall dissolved air exiting the air-dirt separator 10.

The degasser unit 16 illustratively includes a pump 40, a pump-control valve 42, and a controller 44. The pump 40 is fluidly coupled between a draw port in communication with the secondary cavity 22 and a discharge port at the outlet 32 of the housing 12. The pump-control valve 42 is arranged between the pump 40 and the outlet 32 of the housing 12.

The pump 40 is configured to draw on the secondary cavity 22 to lower pressure in the secondary cavity 22. The pump 40 discharges the secondary fluid flow F2 at the outlet 32 of the housing 12 to mix with the primary fluid flow F1 thereby mixing the air-depleted fluid back into the system to reduce the overall air dissolved in fluid exiting the air-dirt separator 10.

The pump-control valve 42 is configured to modulate the flow of fluid discharged from the pump 40. Adjustment of the pump-control valve 42 can control the reduction of pressure in the secondary cavity 22 so that they air-dirt separator is operable with different pumps. In some embodiments, the pump-control valve 42 may be an electronically-controlled valve. In such embodiments, modulation of the flow of fluid discharged from the pump 40 can be adjusted based on sensor input (such as secondary cavity pressure) or other parameters. In manual embodiments, the setting of the pump-control valve 42 can be determined based on pump and hydronic system parameters.

In some embodiments, the air-dirt separator 10 may include pressure-relief means for raising the pressure within the secondary cavity 22 in response to pressure in the secondary cavity 22 moving below a threshold. The pressure-relief means may be provided by a sensor 48 that detects pressure in the secondary cavity 22 and a controller 50 as shown in FIG. 3. The controller 50 may be configured to change operation of the pump 40 and/or modulation of the pump-control valve 42 to raise pressure in the secondary cavity 22.

Figure 4:
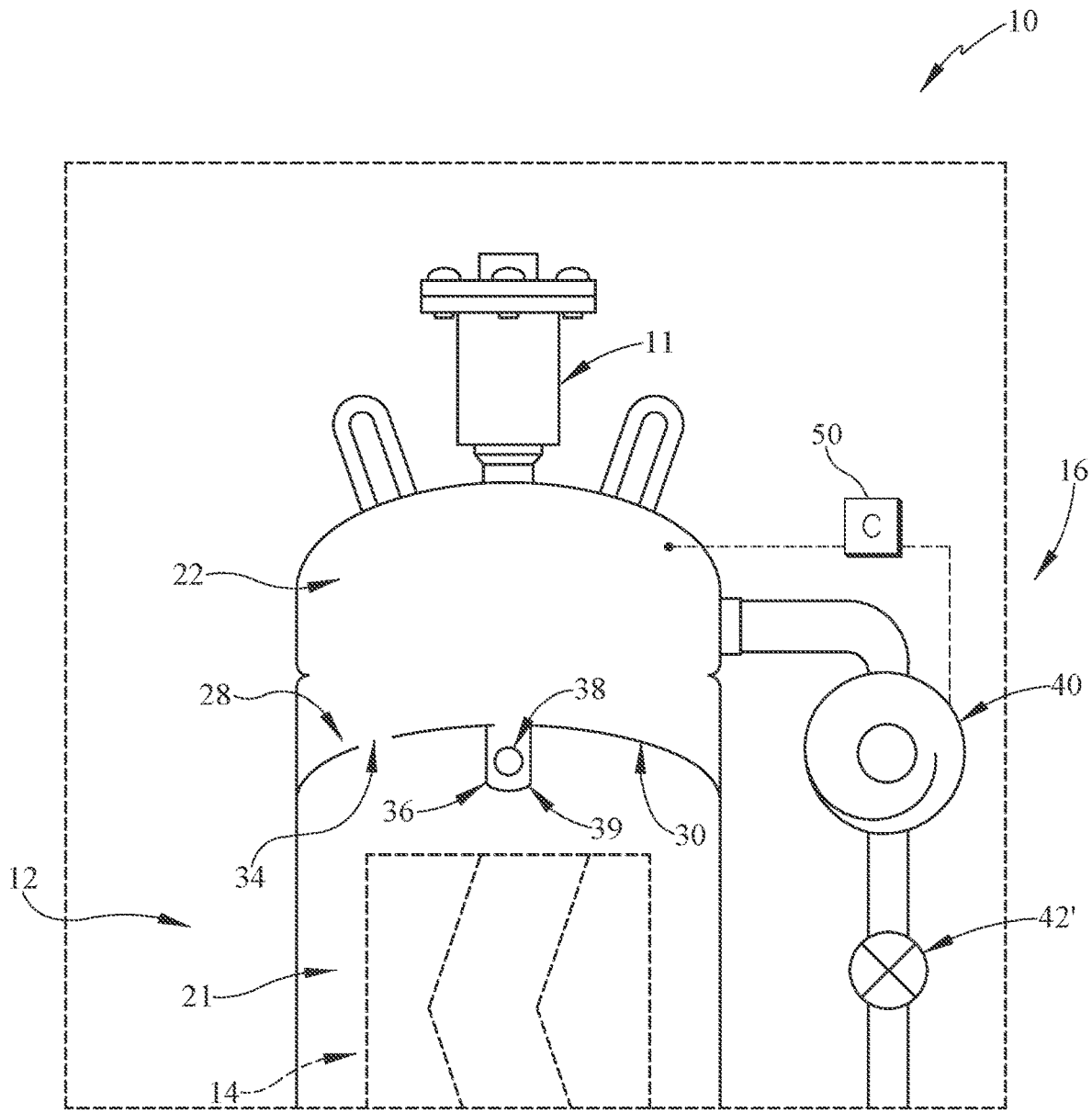
FIG. 4 is a detail view of a portion of an alternative embodiment of the air-dirt separator similar to the view of FIG. 3 showing that the degasser unit may include an optional manual pump-control valve and an optional pressure-relief means provided by a pressure sensor in the secondary cavity and a controller configured to direct the pump based on pressure in the secondary cavity moving below a threshold.

In embodiments with a manual pump-control valve 42' (or without a pump-control valve), the pressure-relief means may be provided by a sensor 48' that detects pressure in the secondary cavity 22' and a controller 50' as shown in FIG. 4. The controller 50' may be configured to change operation of (turn off) the pump 40' to raise pressure in the secondary cavity 22.

Figure 5:
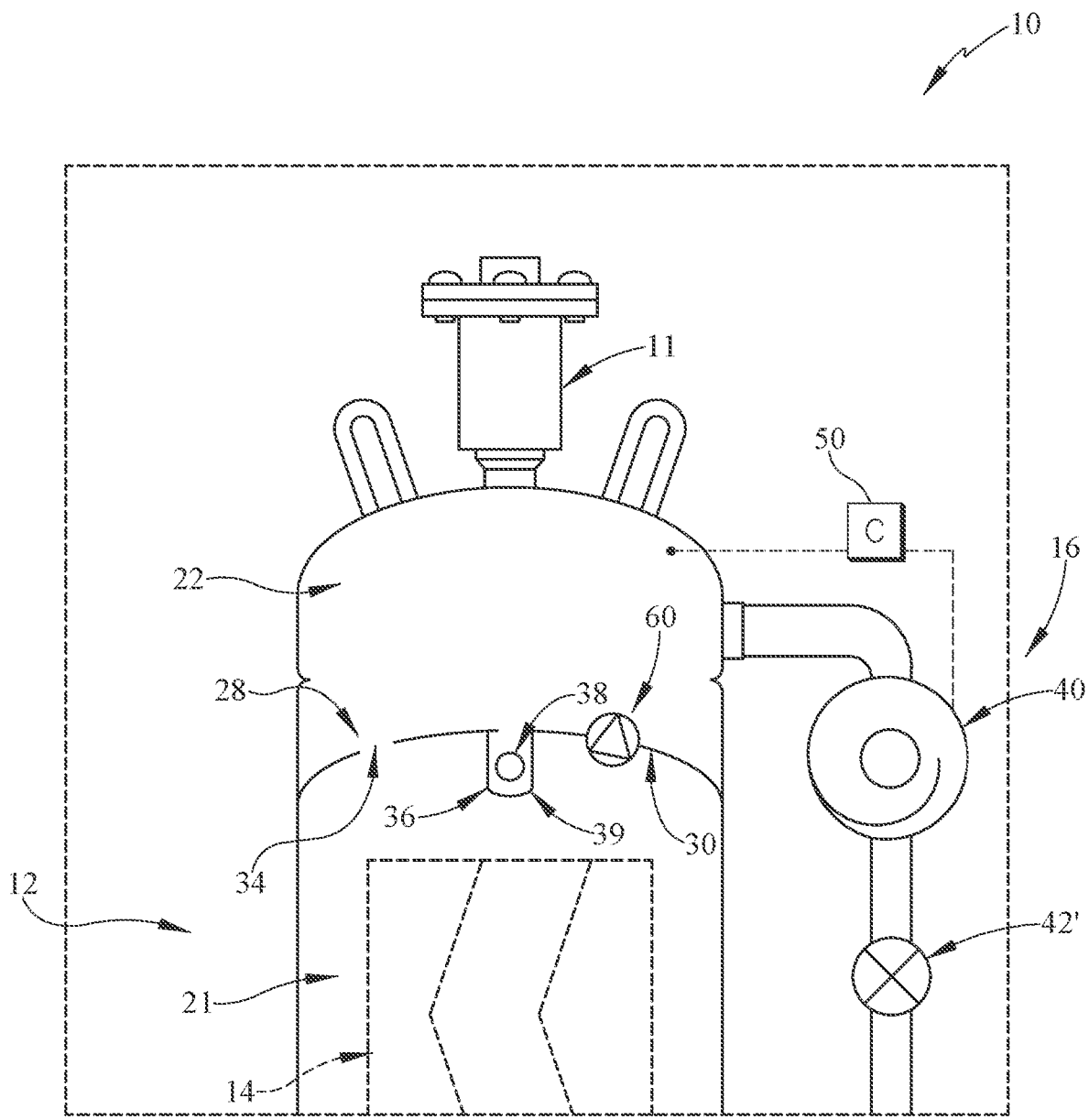
FIG. 5 is a detail view of a portion of an alternative embodiment of the air-dirt separator similar to the view of FIG. 3 showing that the degasser unit may include an optional manual pump-control valve and an optional pressure-relief means provided by a pressure-activated valve that opens upon pressure in the secondary cavity moving below a threshold to allow more fluid to flow from the primary cavity to the secondary cavity.

The pressure-relief means may also be provided by a pressure-activated valve 60 as shown in FIG. 5. The pressure-activated valve 60 may be configured to open upon pressure in the secondary cavity 22 moving below the threshold to allow more fluid to flow from the primary cavity 21 to the secondary cavity 22.

The reduced pressure zone developed in the secondary cavity 22 allows entrained gas and dissolved gases to experience low water pressure that will make existing air bubbles larger and more buoyant, and dissolved gases to come out of solution, which makes it easier to redirect gas out of the system. The returned water to the system will have reduced gas in solution and will scavenge and absorb any gas in the HVAC or filtration system to carry back to the reduced pressure zone in subsequent passes.

The air-dirt separator 10 with the degasser unit 16 may improve air removal efficiency in air & dirt Separator tanks. Air entrained in a hydronic system can cause maintenance problems such as decreased pump performance, increased pump cycles that lead to shorter pump life, noise in pipes, pipe corrosion, and water hammer.

The present disclosure provides a design and a method for removing absorbed air from water or other fluid that leverages the relationship between the amount of dissolved gas in a liquid and partial pressure above the liquid. The present disclosure creates a low pressure zone inside the tank/housing 12 that more efficiently causes air to come out of solution.

The air-dirt separator 10 is designed to eliminate entrained air and separate debris associated with start-up and maintenance of any hydronic system. The designs presented use a pump 40 and pump-control valve 42 to create a low-pressure zone that turns the system water into its own air scrubbing agent. The air-dirt separator can include a removable stack of neodymium rare-earth magnets that filters ferrous particulate, a skim valve used to eliminate floating debris, a removable end cover for coalescing medium access, and an air vent 11 to automatically release air from the separator.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An air-dirt separator adapted for use in a hydronic system, the air-dirt separator comprising
    a housing having an inlet and an outlet each adapted to be fluidly coupled to a line, the housing shaped to define a primary cavity arranged between the inlet and the outlet as well as a secondary cavity arranged above the primary cavity,
    a coalescing media arranged in the primary cavity of the housing so that a primary fluid flow moving directly from the inlet to the outlet interacts with the coalescing media to cause air within the primary fluid flow to agglomerate for venting and to separate dirt within the primary fluid flow to fall to the bottom of the primary cavity,
    an air vent fluidly coupled to the secondary cavity at a first port, the air vent configured to automatically release air from the separator, and
    degassing means fluidly coupled to the secondary cavity at a second port, spaced from the first port, the degassing means (1) for generating a low-pressure zone in the secondary cavity defined by the housing so that air dissolved in a secondary fluid flow moving through the secondary cavity comes out of solution for venting and (2) for joining the secondary fluid flow after air from the secondary fluid flow is vented with the primary fluid flow a so as to allow the secondary fluid flow to absorb air in the primary fluid flow resulting in lower overall dissolved air exiting the air-dirt separator,
    wherein the housing includes partition arranged between the primary cavity and the secondary cavity configured to control fluid flow from the primary cavity to the secondary cavity so as to allow for pressure lower than in the primary cavity to be developed in the secondary cavity,
    wherein the partition includes a diaphragm and a metered flow hole formed through the diaphragm that is sized to allow for pressure lower than in the primary cavity to be developed in the secondary cavity,
    wherein the diaphragm has a dome-shape extending upwardly toward the secondary cavity and separates the primary cavity from the secondary cavity, and
    wherein the partition includes an air-flow valve that fluidly couples the primary cavity with the secondary cavity to allow air to pass from the primary cavity to the secondary cavity when fluid in the primary cavity is below a preset level relative to the partition.

2. The air-dirt separator of claim 1, wherein the degassing means includes pump fluidly coupled to the secondary cavity at the second port and is configured to draw on the secondary fluid flow in the secondary cavity to generate the low-pressure zone in the secondary cavity.

3. The air dirt separator of claim 2, wherein the pump is fluidly coupled to the outlet of the housing and is configured to discharge the secondary fluid flow into the primary fluid flow after the primary flow is downstream of the coalescing media so as to mix the air-depleted secondary flow into the primary flow and thereby reduce the overall air dissolved in fluid exiting the air-dirt separator.

4. The air-dirt separator of claim 3, wherein the degassing means includes a pump-control valve configured to modulate flow moving from the pump toward the outlet of the housing.

5. The air-dirt separator of claim 3, further comprising pressure-relief means for raising the pressure within the secondary cavity in response to pressure in the secondary cavity moving below a threshold.

6. The air-dirt separator of claim 5, wherein the pressure-relief means is provided by an electronic sensor configured to determine pressure in the secondary cavity and a controller coupled to the sensor, and wherein the controller is configured to direct at least one of the pump and the pump-control valve to change operation in response to a signal from the electronic sensor indicative of pressure in the secondary cavity moving below the threshold.

7. The air-dirt separator of claim 1, wherein the air-flow valve is provided by an aperture formed in the top of the dome shape of the diaphragm that is selectively closed by a float when fluid fills the primary cavity to the preset level.

8. The air-dirt separator of claim 1, further comprising a vent arranged at the top of the housing in fluid communication with the secondary cavity, the vent configured to discharge air within the housing.

\* \* \* \* \*